US012591077B2

(12) United States Patent
Syresin et al.

(10) Patent No.: US 12,591,077 B2
(45) Date of Patent: *Mar. 31, 2026

(54) TIME DOMAIN STACKING OF ACOUSTIC DIPOLE LWD MEASUREMENTS

(71) Applicant: Schlumberger Technology Corporation, Sugar Land, TX (US)

(72) Inventors: Denis Syresin, Sugar Land, TX (US); Naoki Sakiyama, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 18/411,114

(22) Filed: Jan. 12, 2024

(65) Prior Publication Data

US 2025/0231312 A1     Jul. 17, 2025

(51) Int. Cl.
 *G01V 1/50*          (2006.01)
 *G01V 1/46*          (2006.01)
(52) U.S. Cl.
 CPC ................. *G01V 1/50* (2013.01); *G01V 1/46* (2013.01); *G01V 2200/16* (2013.01); *G01V 2210/1299* (2013.01); *G01V 2210/32* (2013.01); *G01V 2210/47* (2013.01); *G01V 2210/626* (2013.01)
(58) Field of Classification Search
 CPC ... G01V 1/50; G01V 1/46; G01V 1/48; G01V 2210/32; G01V 2200/16; G01V 2210/47; G01V 2210/1299; G01V 2210/626; E21B 49/00
 See application file for complete search history.

(56) References Cited

U.S. PATENT DOCUMENTS

| | | | |
|---|---|---|---|
| 9,024,776 B2 * | 5/2015 | Sugiyama | ............ G06K 7/0008 |
| | | | 166/255.2 |
| 10,495,771 B2 | 12/2019 | Endo et al. | |
| 11,181,656 B2 | 11/2021 | Syresin et al. | |
| 11,353,615 B2 * | 6/2022 | Assous | ................. G01V 1/305 |

(Continued)

FOREIGN PATENT DOCUMENTS

| | | |
|---|---|---|
| CN | 105473813 | 4/2016 |

OTHER PUBLICATIONS

Esmersoy, C. et al., "Fracture and Stress Evaluation Using Dipole-Shear Anisotropy Logs", 36th Annual Logging Symposium, 1995, 12 pages.

*Primary Examiner* — Daniel L Murphy
*Assistant Examiner* — Amie M N'dure
(74) *Attorney, Agent, or Firm* — Kyle R. Miiller

(57)          ABSTRACT

A method for acoustic logging a wellbore includes making a plurality of directional sonic logging measurements while rotating an acoustic logging tool in a wellbore. A plurality of orthogonal pairs of measurements are identified among the measurements. Each of the orthogonal pairs includes a first measurement having a measured angle of a transmitter firing direction that is perpendicular with a measured angle of a transmitter firing direction of a second measurement within a predetermined tolerance. A set of 4C component waveforms is compiled for each of the identified orthogonal pairs and mathematically rotated to align with predefined axes. Selected ones of the rotated waveforms are then stacked in the time domain.

20 Claims, 10 Drawing Sheets

(56)                  References Cited

U.S. PATENT DOCUMENTS

| | | | | |
|---|---|---|---|---|
| 2008/0068209 A1* | 3/2008 | Sugiyama | ............ | G06K 7/0008 |
| | | | | 340/853.2 |
| 2008/0273422 A2* | 11/2008 | Donald | .................... | G01V 1/50 |
| | | | | 367/40 |
| 2011/0042080 A1* | 2/2011 | Birchwood | ............. | G01V 1/50 |
| | | | | 166/308.1 |
| 2012/0111561 A1* | 5/2012 | Frey | ..................... | E21B 47/113 |
| | | | | 166/250.03 |
| 2013/0311147 A1* | 11/2013 | Greenwood | ............ | G06F 30/00 |
| | | | | 703/1 |
| 2015/0034386 A1* | 2/2015 | Reed | ..................... | E21B 34/10 |
| | | | | 175/48 |
| 2015/0253447 A1* | 9/2015 | Mukhopadhyay | ....... | G01V 1/48 |
| | | | | 702/6 |
| 2016/0108724 A1* | 4/2016 | Jarrot | ..................... | E21B 47/13 |
| | | | | 702/191 |
| 2016/0187527 A1* | 6/2016 | Berheide | ................. | G01V 5/14 |
| | | | | 250/269.1 |

| | | | | |
|---|---|---|---|---|
| 2016/0209538 A1* | 7/2016 | Wang | ........................ | G01V 1/48 |
| 2016/0298418 A1* | 10/2016 | James | ................... | E21B 34/066 |
| 2017/0103144 A1* | 4/2017 | Badri | ..................... | G01V 1/302 |
| 2017/0123098 A1* | 5/2017 | Wang | ..................... | G06N 20/00 |
| 2018/0196156 A1* | 7/2018 | Assous | ................... | G01V 1/46 |
| 2018/0347338 A1* | 12/2018 | Abbad | .................... | E21B 49/08 |
| 2019/0179048 A1* | 6/2019 | Syresin | ................... | G01V 1/46 |
| 2021/0388691 A1* | 12/2021 | Barker | ............... | E21B 17/1085 |
| 2022/0120169 A1* | 4/2022 | Rodney | ................. | E21B 49/003 |
| 2022/0120171 A1* | 4/2022 | Rodney | .................. | E21B 44/00 |
| 2023/0243634 A1* | 8/2023 | Dai | ......................... | G01V 1/50 |
| | | | | 166/250.01 |
| 2023/0316152 A1* | 10/2023 | Khan | ..................... | G06N 20/20 |
| | | | | 706/12 |
| 2023/0366274 A1* | 11/2023 | Zhan | ..................... | H01R 13/523 |
| 2024/0218787 A1* | 7/2024 | Bethancourt | ......... | E21B 47/007 |
| 2024/0352847 A1* | 10/2024 | Andegeorgs | ........ | E21B 47/0025 |
| 2024/0369733 A1* | 11/2024 | Sheng | ..................... | G01V 3/38 |
| 2025/0043681 A1* | 2/2025 | Poitzsch | .............. | E21B 49/005 |

* cited by examiner

Monopole          Dipole          Quadrupole          Unipole

*FIG. 4*
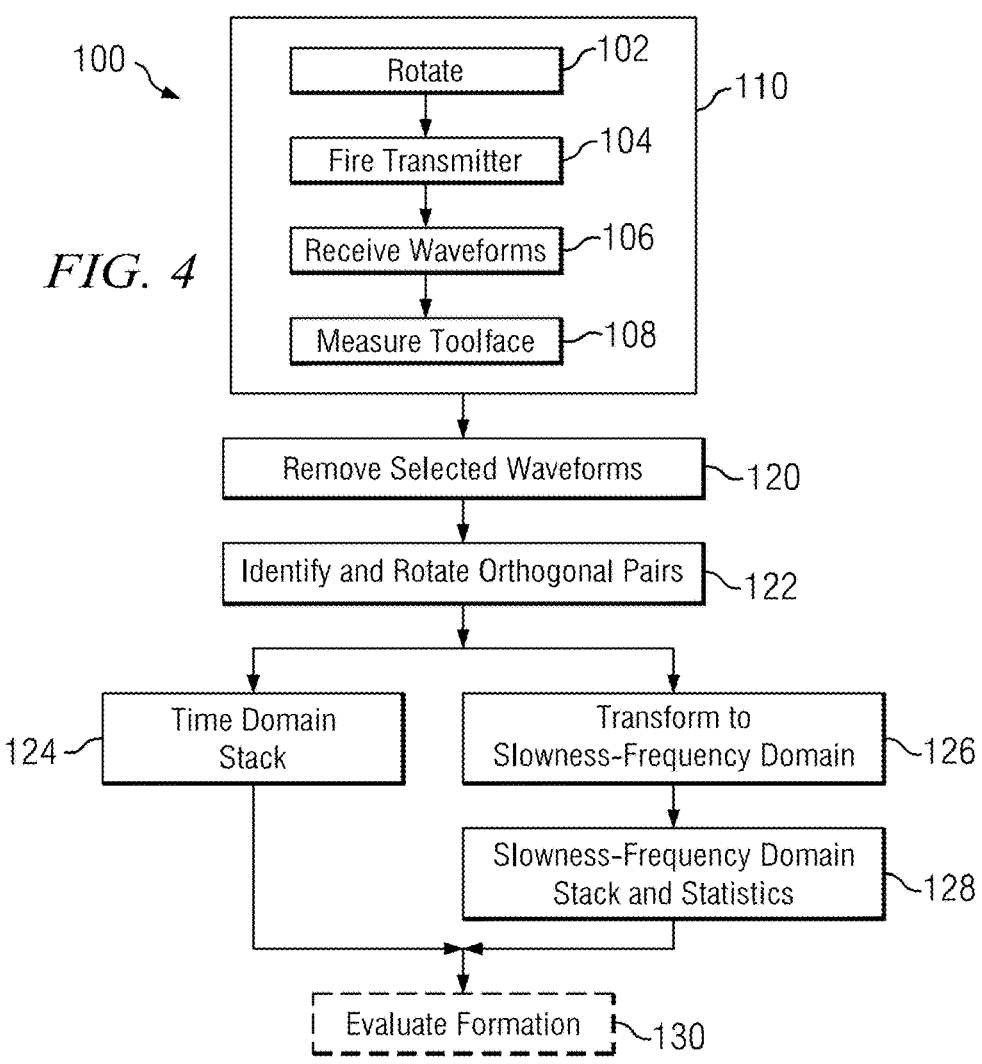
*FIG. 5A*          *FIG. 5B*
*FIG. 5C*          *FIG. 5D*
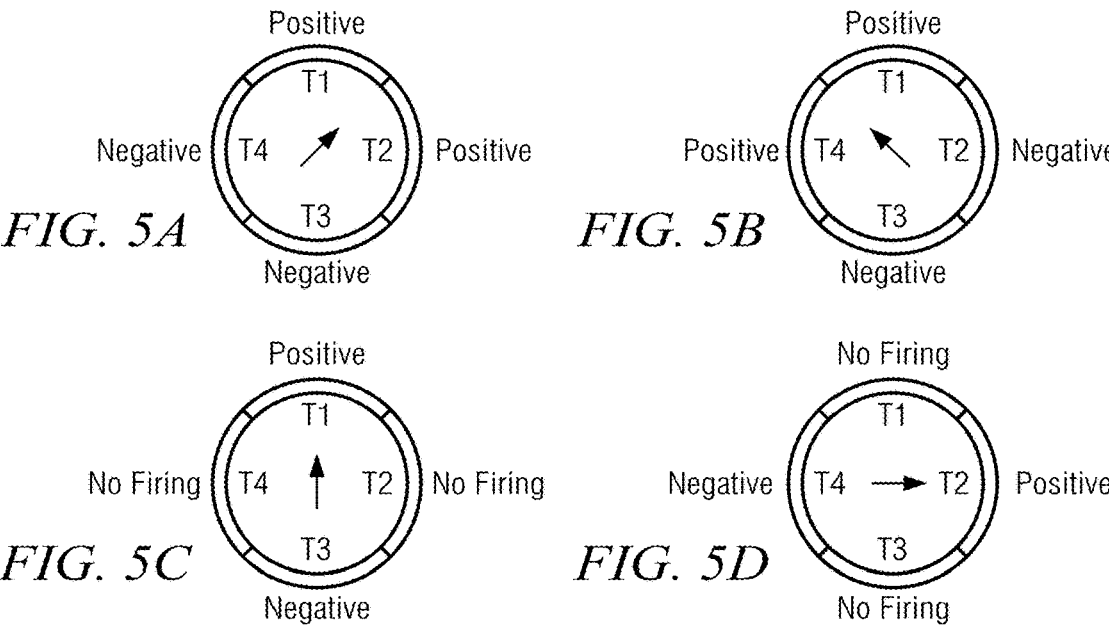

300

320

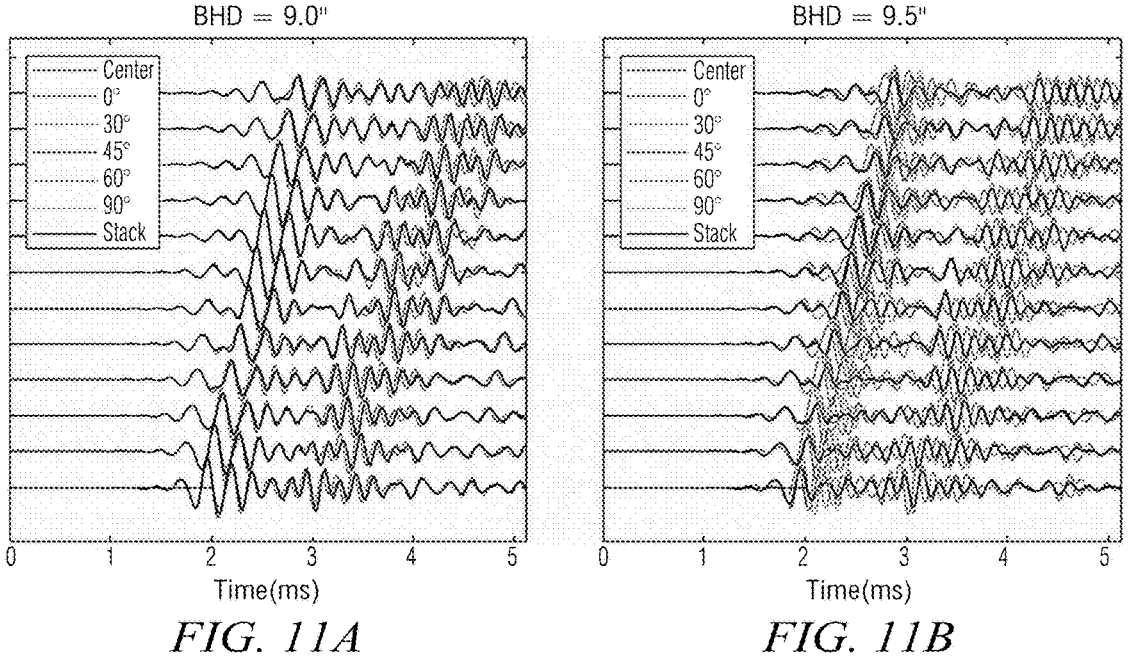
FIG. 11A                                    FIG. 11B
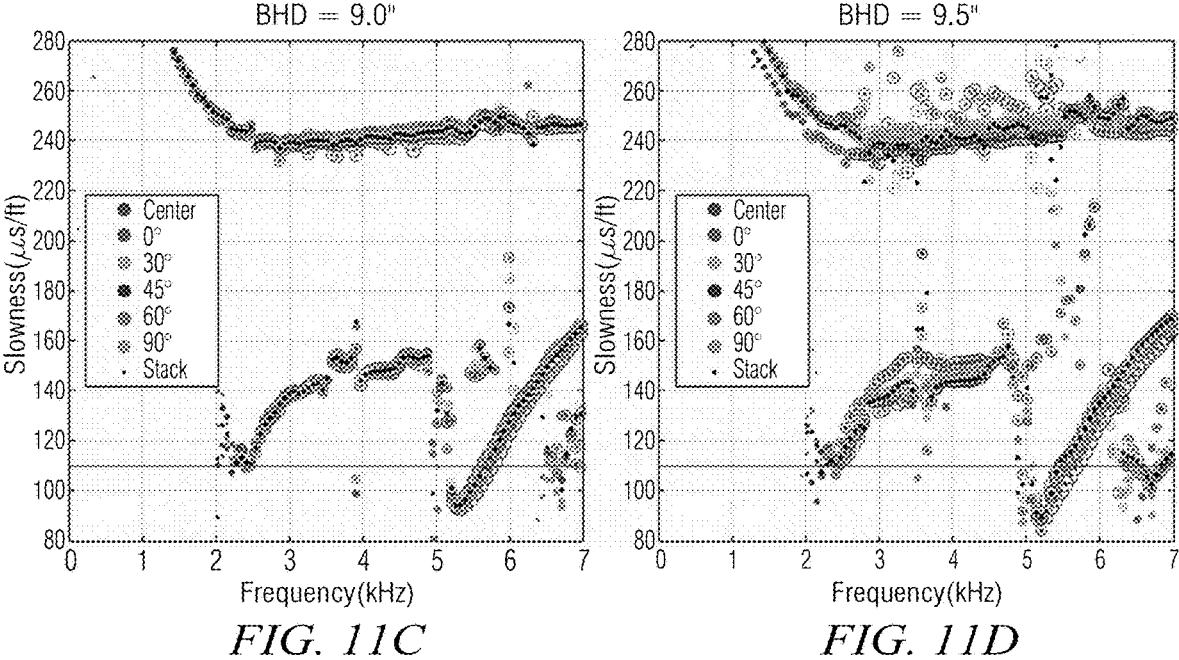
FIG. 11C                                    FIG. 11D

400

Make Sonic Dipole
LWD Measurements          402

Identify Orthogonal Pairs          404

Compile 4C
Component Waveforms          406

Rotate 4C Component Waveforms
to Align with X and Y Axes          408

Accumulate Rotated
Waveforms and Transform to
Slowness-Frequency Domain          410

Stack Transformed
Waveforms in the
Slowness-Frequency Domain          412

Compute Variance
Statistics          414

Evaluate Formation          416

TIME DOMAIN STACKING OF ACOUSTIC DIPOLE LWD MEASUREMENTS

CROSS REFERENCE TO RELATED APPLICATIONS

None.

BACKGROUND

Acoustic (sonic) logging measurements are well-known and commonly utilized in downhole logging applications, such as in logging while drilling (LWD) and wireline logging (WL) applications. Acoustic logging measurements may be utilized, for example, to determine the slowness (inverse velocity) of sonic energy through a formation, which, along with other logging measurements may be used to estimate the porosity of the formation. Acoustic logs may also be used, for example, to identify formation lithology and source rock as well as to identify other borehole features such as fractures and compaction.

The presence of intensive drilling-related noise is a major difficulty for LWD sonic applications. Such noise can result in a very low signal to noise ratio (SNR) that reduces the utility of the collected data. This difficulty is often mitigated in azimuthally insensitive measurements, such as monopole or quadrupole measurements, by stacking (or averaging) multiple waveforms acquired at a similar depth. However, for the case of azimuthally sensitive (directional) measurements, such as dipole measurements, the use of prior art stacking methods averages out the azimuthal information in the measurements such that they become azimuthally insensitive (e.g., insensitive to transverse anisotropy in the formation). Therefore, conventional LWD dipole measurements are made with un-stacked dipole waveforms that often suffer from low (or even severely low) SNR.

There is a need in the industry to improve the SNR of sonic LWD dipole measurements for making azimuthally sensitive (directional) sonic measurements.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 4 depicts a flowchart of one example method for making directional sonic logging measurements.

FIGS. 5A, 5B, 5C, and 5D (collectively FIG. 5) depict example dipole transmissions (firings) using the multipole transmitter shown on FIG. 2.

FIGS. 11A, 11B, 11C, and 11D (collectively FIG. 11) depict example modeled dipole waveforms (11A and 11B) and corresponding slowness frequency dispersion curves (11C and 11D) obtained using the method disclosed in FIG. 9.

DETAILED DESCRIPTION

Methods and systems for making acoustic LWD measurements are disclosed. In one example embodiment, a method for acoustic logging a wellbore includes rotating a logging tool in a wellbore penetrating a subterranean formation, the logging tool including an acoustic transmitter and a directional acoustic receiver including a plurality of circumferentially spaced receiver arrays; making a plurality of directional sonic logging measurements while rotating the logging tool in the wellbore; identifying a plurality of orthogonal pairs of measurements among the plurality of directional sonic logging measurements, wherein each of the plurality of orthogonal pairs includes a first measurement and a second measurement, wherein a measured angle of a transmitter firing direction of the first measurement is orthogonal with a measured angle of a transmitter firing direction of the second measurement within a predetermined tolerance; compiling 4C component waveforms for each of the identified plurality of orthogonal pair of waveforms; rotating the compiled 4C component waveforms to align with predefined axes; and stacking selected ones of the rotated 4C component waveforms in the time domain.

Example embodiments of this disclosure may advantageously provide improved acoustic logging measurements having improved SNR. The disclosed embodiments may further provide additional quality control information (e.g., such as a measurement variance) for evaluating the improved SNR and consistency of the measurement.

Figures 1, 2, 3:
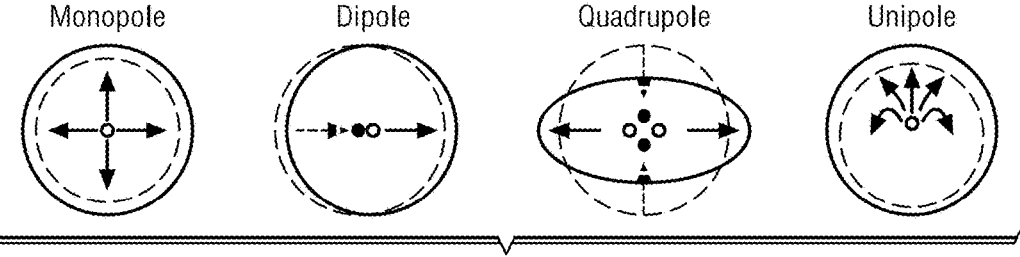
FIG. 1 depicts an example drilling rig including a disclosed directional sonic logging tool.
FIG. 2 depicts a portion of one example embodiment of the directional sonic logging tool shown on FIG. 1.
FIG. 3 depicts example monopole, dipole, quadrupole, and unipole transmitter firing modes for the example transmitter depicted in FIG. 2.

FIG. 1 depicts an example drilling rig 20 including a disclosed directional sonic (acoustic) logging tool 50. The drilling rig 20 may be positioned over a subterranean formation (not shown) and may be configured for drilling a geothermal well or a hydrocarbon exploration and/or production well. The rig 20 may include, for example, a derrick and a hoisting apparatus (also not shown) for raising and lowering a drill string 30, which, as shown, extends into wellbore 40 and includes a bottom hole assembly that may further include, for example, a drill bit 32, a steering tool (such as a rotary steerable tool), and other logging while drilling (LWD) tools and measurement while drilling (MWD) tools. It will be appreciated that the disclosed embodiments are not limited to any particular drill string or BHA configuration.

A wellbore 40 may be formed in and thereby penetrate subsurface formations by rotary drilling or slide drilling in a manner that is well-known to those or ordinary skill in the art (e.g., via well-known directional drilling techniques). For example, the drill string 30 may be rotated at the surface and/or via a downhole deployed mud motor to drill the well. A pump may deliver drilling fluid to the interior of the drill string 30 thereby causing the drilling fluid to flow downwardly through the drill string 30. The drilling fluid exits the drill string 30, e.g., via ports in the drill bit 32, and then circulates upwardly through the annulus 42 between the outside of the drill string 30 and the wall of the wellbore 40. In this known manner, the drilling fluid lubricates the drill bit 32 and carries formation cuttings uphole to the surface. LWD measurements, such as sonic LWD measurements, are made while drilling and are commonly subject to extreme drilling noise as the drill bit engages the formation.

It will be further understood that the disclosed embodiments are not limited to use with an on-shore rig 20 as illustrated on FIG. 1. The disclosed embodiments are equally well suited for use with either onshore or offshore subterranean operations.

Turning now to FIG. 2, one example embodiment of directional sonic logging tool 50 is depicted. In the depicted example, the tool 50 includes an acoustic transmitter 60 and an acoustic receiver 70 axially spaced apart from one another on a tool collar 55. The tool collar 55 and any optional internal mandrel or external stabilizer blades may be referred to collectively herein as a tool body. The acoustic transmitter 60 may include a multipole transmitter including a plurality (e.g., four or six) azimuthally (circumferentially) spaced transmitter (transducer) elements T1, T2, T3, T4. The acoustic receiver 70 may include a directional receiver further including a plurality of azimuthally spaced receiver arrays R1, R2, R3, R4, in which each receiver array includes a plurality of axially spaced receiver (transducer) elements (e.g., 8 or 12 axially spaced transducers per array). The multipole transmitter and the directional receiver may be configured to transmit and receive acoustic signals with different azimuthal harmonics. For example, monopole, dipole, quadrupole, and unipole wavefields may be transmitted and received by the directional sonic logging tool 50.

With continued reference to FIG. 2, example mode excitations are listed below for the depicted multimode transmitter 60. These transmitted modes may include, for example:

$$\text{Monopole} = T1 + T2 + T3 + T4$$

$$\text{Dipole1} = T1 + T2 - T3 - T4$$

$$\text{Dipole2} = T1 - T2 - T3 + T4$$

$$\text{Dipole3} = T1 - T3$$

$$\text{Dipole4} = T2 - T4$$

$$\text{Quadrupole} = T1 - T2 + T3 - T4$$

$$\text{Unipole} = Ti$$

Examples of the mode extraction or reception after signal detection via the directional receiver 70 may include, for example:

$$\text{Monopole} = R1 + R2 + R3 + R4$$

$$\text{Dipole1} = R1 + R2 - R3 - R4$$

$$\text{Dipole2} = R1 - R2 - R3 + R4$$

$$\text{Dipole3} = R1 - R3$$

$$\text{Dipole4} = R2 - R4$$

$$\text{Quandrupole} = R1 - R2 + R3 - R4$$

$$\text{Unipole} = Ri$$

With further reference to FIG. 3, characteristics of example multipole transmissions (including monopole, dipole, quadrupole, and unipole) have been illustrated. It should be noted that the dipole excitation example in FIG. 3 corresponds with Dipole-4 described above with respect to FIG. 2. Owing to the directivity of the firing directions, dipole and unipole may be used for estimating azimuthal variation of elastic properties. The estimation may be especially effective for anisotropic formations and may be used in, for example, a deviated well in vertical axis of symmetry (VTI) formations.

With continued reference to FIG. 2, directional sonic logging tool 50 may further include an electronic controller 80 configured to cause the tool 50 to make directional (e.g., dipole) sonic LWD measurements while the tool 50 rotates in a wellbore (e.g., wellbore 40 in FIG. 1). The controller 80 may be configured to cause the multimode transmitter 60 to transmit, for example, a dipole waveform into the wellbore. The controller 80 may be further configured to cause the directional receiver 70 to receive the transmitted waveform. The controller 80 may be still further configured to process the received waveforms to improve the SNR of the directional sonic logging measurements. For example, the controller 80 may be configured screen the received waveforms and to remove those waveforms having excessive noise as described in example embodiments with respect to FIGS. 6-8, to stack rotated waveforms in the time domain as described in example embodiments with respect to FIGS. 9-11, and/or to stack and statistically evaluate received waveforms in the frequency-slowness domain as described in example embodiments with respect to FIGS. 12-13. To perform these functions, the controller may include hardware such as one or more processors (e.g., microprocessors) which may be connected to one or more data storage devices (e.g., hard drives or solid state memory). It will be further understood that the controller may further include processor executable instructions stored in the data storage device. The executable instructions may be configured, for example, to make and process sonic logging measurements as described herein. It will, of course, be understood that the disclosed embodiments are not limited to the use of or the configuration of any particular computer hardware and/or software.

It will be understood that while not depicted, sonic logging tool 50 may further include one or more toolface (azimuth) sensors, for example, including an accelerometer set, a magnetometer set, or a gyroscopic sensor set. A toolface sensor may be configured to measure the angular orientation of the multipole transmitter 60 and the directional receiver 70 while the tool rotates and to pair the measurements with a corresponding angle (e.g., via time stamping the measurements). These measurements may then be processed as described in more detail below to construct azimuthal (directional) sonic logging measurements. It will be appreciated that the toolface sensor(s) may also be deployed elsewhere in the drill string, for example, in an MWD tool or a rotary steerable tool and that the sonic logging tool 50 may be in electronic communication with such remote toolface sensor(s).

Turning now to FIG. 4, a flowchart of one example method 100 for making directional sonic logging measurements is depicted. Method 100 may advantageously provide directional sonic logging measurements having an improved SNR. A plurality of directional sonic logging measurements are made at 110. Making the measurements may include rotating a sonic logging tool (such as tool 50) in a wellbore (e.g., as depicted on FIG. 1) at 102. A transmitter (such as multipole transmitter 60) may be fired while the tool rotates at 104 to generate dipole acoustic waves in the borehole (wellbore) and surrounding formation. The transmitted dipole waves may be received by a directional receiver (such as directional receiver 70) at 106. Toolface measurements may be made at 108 to determine the rotational orientation of the sonic logging tool in the wellbore while rotating, firing, and receiving.

The sonic logging measurements may be evaluated at 120 to remove selected waveforms from the measurements made at 110. In example embodiments, the evaluation at 120 may be intended (or configured) to identify and remove those waveforms that are particularly noisy, for example, those waveforms for which the drilling noise exceeds a threshold. As described in more detail below with respect to FIGS. 6-8, the evaluation at 120 may include, for example, evaluating the monopole component in each of the acquired waveforms and removing those waveforms that have a monopole component that exceeds a threshold. Removal of the high noise waveforms may advantageously improve the SNR of the directional sonic measurements.

The remaining waveforms may then be further processed at 122, for example, to identify and mathematically rotate orthogonal pairs of measurements, as described in more detail below. The orthogonal pairs may be processed mathematically (referred to herein as rotated) so they have the same (or about the same) azimuthal orientation (toolface angle), for example, aligned with predetermined X and Y axes. The rotated waveforms may then be stacked (averaged) in the time domain at 124, for example, as described in more detail below with respect to FIGS. 9-11. Time domain stacking (e.g., averaging or averaging with coefficients) of the rotated waveforms may also advantageously improve the SNR of the directional sonic measurements. In example embodiments, the time domain stacking may include computing a weighted average in which the weighting coefficients are derived from an inverse of monopole amplitudes (such that waveforms having smaller monopole amplitudes are weighted more heavily).

The rotated waveforms may also be accumulated (e.g., overlayed with one another) and the accumulated waveforms transformed to the frequency-slowness domain at 126. Equivalently, the individual waveforms may first be transformed and then the resulting frequency-slowness dispersion curves may be accumulated. The accumulated and transformed (or transformed and accumulated) waveforms may then be stacked (e.g., averaged) in the frequency domain at 128 as described in more detail below with respect to FIGS. 12 and 13. The stacking at 128 may further include a performing statistical analysis that estimates a standard deviation of the averaged dispersions (or other statistical measure of the dispersion variance). The frequency domain stacking and the statistical analysis thereof may also advantageously improve the SNR of the directional sonic measurements and assess impact of the noise for quality control (QC) purposes.

With continued reference to FIG. 4, the screened waveforms, the time domain stacked waveforms, and/or the frequency domain stacked waveforms may be further processed and evaluated at 130 to assemble a log and/or to estimate one or more properties of the subterranean formation. Such evaluation may include, for example, applying a curve fitting technique based on theoretical and/or mathematical models, or applying machine-learning method to derive shear slowness from the slowness-frequency dispersion. The derived shear slowness can be compiled to display as a depth log together with QC information available from the attributes in 124, 126, and 128. It will be appreciated that method 100 includes three distinct data processing steps, each of which is intended to reduce the SNR of the directional sonic measurements. Example implementations of method 100 may incorporate any one or more (or even all three) of these data processing steps.

With still further reference to FIG. 4, the directional sonic logging tool may be rotated in the wellbore at 102, for example, while drilling or reaming the wellbore. Such rotation may be actuated, for example, by rotating a drill string at the surface with a top drive or via rotating the BHA using a mud motor. As noted above, toolface measurements may be made at 108 while rotating, for example, via making magnetometer measurements as is known to those of ordinary skill. An acoustic transmitter, such as a dipole transmitter or a multimode transmitter, may be fired at 104 to propagate dipole waves into the wellbore and the surrounding formation. In example embodiments in which a multimode transmitter is employed, dipole waves may be transmitted using one of the dipole transmission configurations described above with respect to FIG. 2. The transmitter may be configured to continuously fire as the tool rotates to obtain sonic measurements at different rotational (azimuthal) orientations. In example embodiments the transmitter may fire at a predetermined or programmed pattern of time intervals while the tool rotates in the wellbore. The disclosed embodiments are, of course, not limited to any particular transmitter firing interval. The transmitted waves may be received by a directional sonic receiver at 106, such as described above with FIG. 2. For example, the transmitted waves may be received by each of the receiver elements in receiver arrays R1, R2, R3, and R4.

FIGS. 5A, 5B, 5C, and 5D (collectively FIG. 5) depict example dipole transmissions (firings) using multipole transmitter 60 (FIG. 2). These figures show general configurations for dipole mode excitation and are not intended to be limiting. In FIG. 5A, transmitters T1 and T2 are positively powered while transmitters T3 and T4 are negatively powered. In this specific case, the dipole mode excitation is oriented at +45 degrees as indicated by the arrow. In FIG. 5B, transmitters T1 and T4 are positively powered while transmitters T2 and T3 are negatively powered, thereby resulting in a dipole mode excitation orientation of −45 degrees as indicated by the arrow. In FIG. 5C, transmitter T1 is positively powered while transmitter T3 is negatively powered. Transmitters T2 and T4 do not fire. The resulting dipole mode excitation is oriented at +90 degrees as indicated by the arrow. In FIG. 5D, transmitter T2 is positively powered and transmitter T4 negatively powered. Transmitters T1 and T3 do not fire. The resulting dipole mode excitation is oriented at 0 degrees as indicated by the arrow.

With reference again to FIG. 4, the sonic logging measurements may be evaluated at 120 to remove selected waveforms, such as noisy waveforms, from the measure-
ments to improve the overall SNR. One aspect of the
disclosed embodiments was the realization that the received
dipole waveforms and the resultant dispersions may be
highly influenced by adverse effects of tool eccentering and
drilling noise. It was further realized that tool eccentering
and drilling noise can be identified using (or correlated with)
monopole noise measurements, particularly when the dipole
is excited in the same (or a similar) direction as eccentering
direction.

Figure 6A:
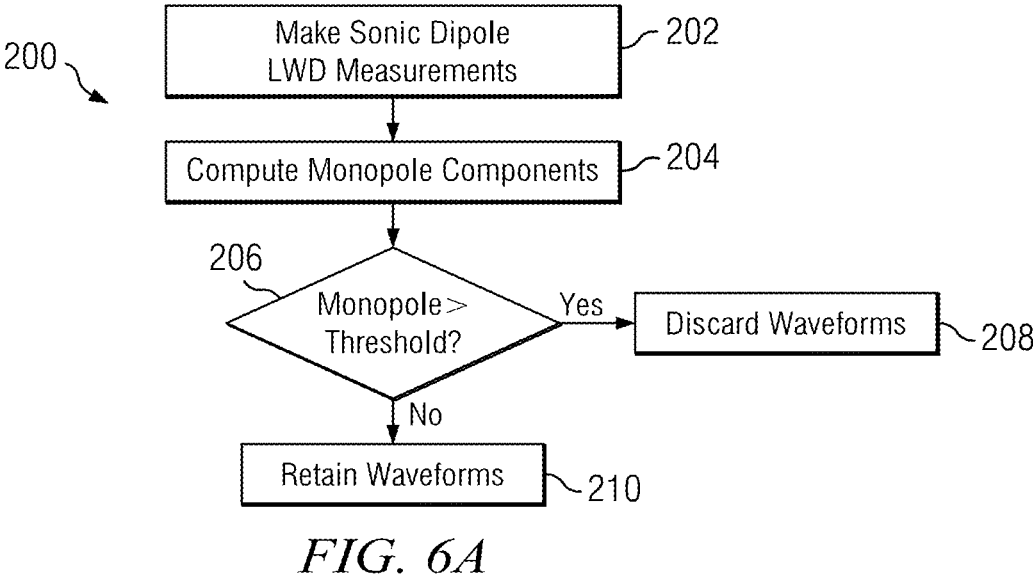
FIGS. 6A and 6B (collectively FIG. 6) depict flow charts of further example methods for making sonic logging measurements.
Figure 6B:
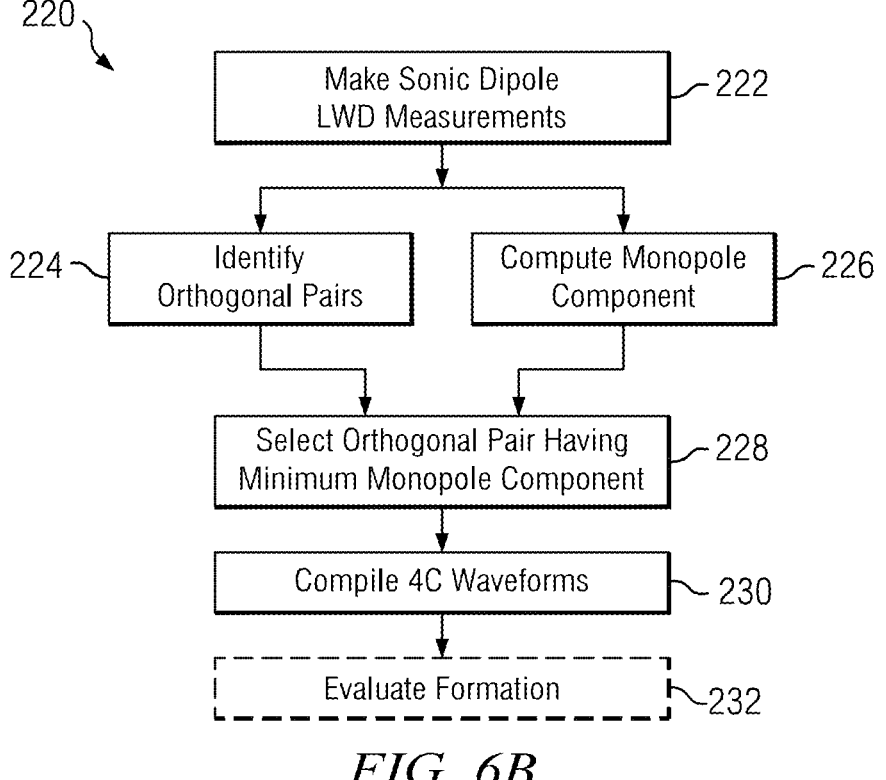

FIGS. 6A and 6B (collectively FIG. 6) depict a flow charts
of an example methods 200, 220 for making sonic logging
measurements. In FIG. 6A, a plurality of sonic dipole
logging measurements is made at 202 while rotating a
logging tool in a wellbore (e.g., as described above with
respect to 110 of FIG. 4). The measurements are evaluated
at 204 to compute monopole components of the received
waveforms, for example, by summing the received wave-
forms at each of the azimuthally spaced receiver arrays (e.g.,
R1, R2, R3, and R4). The monopole components may then
be compared with a threshold at 206. The received wave-
forms may be discarded at 208 when the monopole com-
ponent is greater than the threshold and may be retained
(e.g., recorded and/or further processed) at 210 when the
monopole component is less than the threshold. It will be
appreciated that the disclosed embodiments are not limited
to any particular threshold or method for selecting a thresh-
old. In example embodiments, the threshold may be selected
to achieve a desired SNR or such that a preselected number
of measurements are retained.

With continued reference to FIG. 6A, further processing
may include, for example, identifying orthogonal pairs of
measurements and compiling the corresponding 4C compo-
nents as described in more detail below. In this way the
measurements may be screened, with the screening criteria
being the magnitude of the monopole component. Again,
those measurements having a high monopole component,
which is indicative of drilling noise and/or the tool eccen-
tering, may be discarded while the measurements having a
lower monopole component are retained and further pro-
cessed to generate a log and/or evaluate formation proper-
ties.

In FIG. 6B, sonic dipole logging measurements are made
at 222 while rotating a logging tool in a wellbore (e.g., as
described above with respect to 110 of FIG. 4). The mea-
surements may be evaluated at 224 to select orthogonal pairs
of measurements that meet predetermined orthogonality
criteria. Stated another way first and second measurements
may be paired when their respective transmitter firing angles
are orthogonal to one another within the predetermined
orthogonality criteria (e.g., within plus or minus five or ten
degrees of being orthogonal in one example embodiment).
The measurements may be further evaluated at 226 to
compute monopole components of the received waveforms,
for example, by summing the received waveforms at each of
the azimuthally spaced receiver arrays (e.g., R1, R2, R3, and
R4). In optional embodiments, the orthogonal pair having
the minimum monopole amplitude may be selected at 228
and the corresponding 4C component waveforms compiled
and recorded at 230. The compiled 4C component wave-
forms may then be optionally processed and evaluated at
232 to assemble a log and/or estimate one or more properties
of the subterranean formation. In other optional embodi-
ments, the orthogonal pairs having a monopole amplitude
less than a threshold (e.g., as described above with respect
to FIG. 6A) may be retained and further processed.

With continued reference to FIG. 6B, identifying the
orthogonal pair(s) of measurements at 224 may include
evaluating the rotational orientation (toolface angle) corre-
sponding to each of the transmitter dipole firings used to
make the sonic dipole logging measurements at 222. The
rotational orientations (toolface angles) may then be evalu-
ated to identify the orthogonal pairs. By orthogonal pairs it
is meant pairs of measurements for which the transmitter
firings have corresponding rotational orientations that are
orthogonal or near orthogonal to one another. The term
orthogonal pairs may also refer to the corresponding
received waveforms at the receiver array that are aligned
with each of the orthogonal transmitter firings. These wave-
forms may further be referred to as XX and YY measure-
ments (or an XX and YY orthogonal pair). It will, of course,
be understood that by orthogonal it is meant that the rota-
tional orientations have a difference of 90 degrees (e.g.,
within an acceptable orthogonality error such as 5 or 10
degrees).

With still further reference to FIG. 6B, the orthogonal
pair, from among the identified orthogonal pairs, having the
minimum (or lowest) amplitude monopole component may
be retained and stored to memory at 230 along with the
compiled 4C component waveforms. It will be appreciated
that by 4C component waveforms it is meant the XX and YY
orthogonal pair (the coupling components) and the XY and
YX cross components, where the first symbol (X or Y)
represents the transmitter firing orientation and the second
symbol (X or Y) represents the receiver orientation at the
time of the transmitter firing. For example only, when a
dipole firing occurs in the direction of FIG. 5D, an XX
waveform may be the waveform received by R2 and R4 and
an XY waveform may be received by R1 and R3. Likewise,
when a dipole firing occurs in the direction of FIG. 5C,
waveform YY may be received by R1 and R3 and YX may
be received by R2 and R4. It will be appreciated that the
transmitter firing orientation of T1, T2, T3, and T4, changes
while the tool rotates, so this example should not be under-
stood to imply that the X and Y directions are always defined
with respect to the T2 or T1 direction.

Figures 7A, 7B, 8A, 8B:
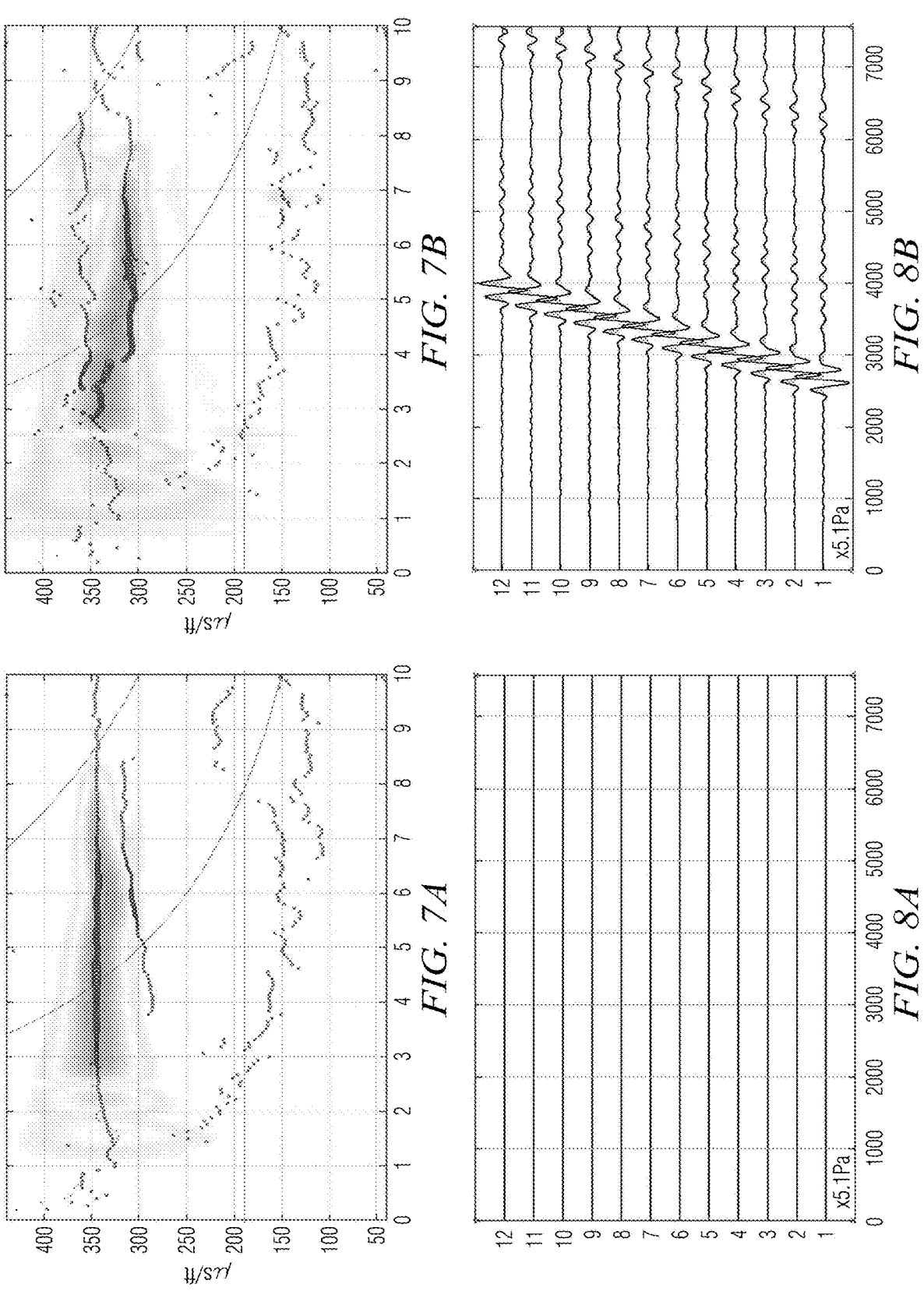
FIGS. 7A, 7B, 7C, 7D, 7E, and 7F (collectively FIG. 7) depict modeled slowness-frequency dispersion curves that illustrate the effect of the relationship between eccentering direction and dipole orientation.
FIGS. 8A, 8B, 8C, 8D, 8E, and 8F (collectively FIG. 8) depict monopole decomposed waveforms corresponding to the dispersion curves shown in FIG. 7.

FIGS. 7A-7F (collectively FIG. 7) depict slowness fre-
quency dispersion curves that show the effect of the rela-
tionship between eccentering direction and dipole orienta-
tion. In FIG. 7A, the tool is centered in the wellbore. In FIG.
7B, the eccentering direction is parallel (aligned) with the
dipole orientation. In FIGS. 7C-7F, the angles between the
eccentering direction and the dipole orientation are 30, 45,
60, and 90 degrees respectively. Note the significant increase
in dispersion noise in FIGS. 7B and 7C when the angles
between the eccentering direction and the dipole orientation
are 0 and 30 degrees respectively. The observed dispersion
noise is significantly less in FIGS. 7D and 7E when the
angles between the eccentering direction and the dipole
orientation are 45 and 60 degrees respectively and is mini-
mal in FIG. 7F when the angle between the eccentering
direction and the dipole orientation is 90 degrees (when the
eccentering direction and the dipole orientation are orthogo-
nal).

Figures 7C, 7D, 8C, 8D:
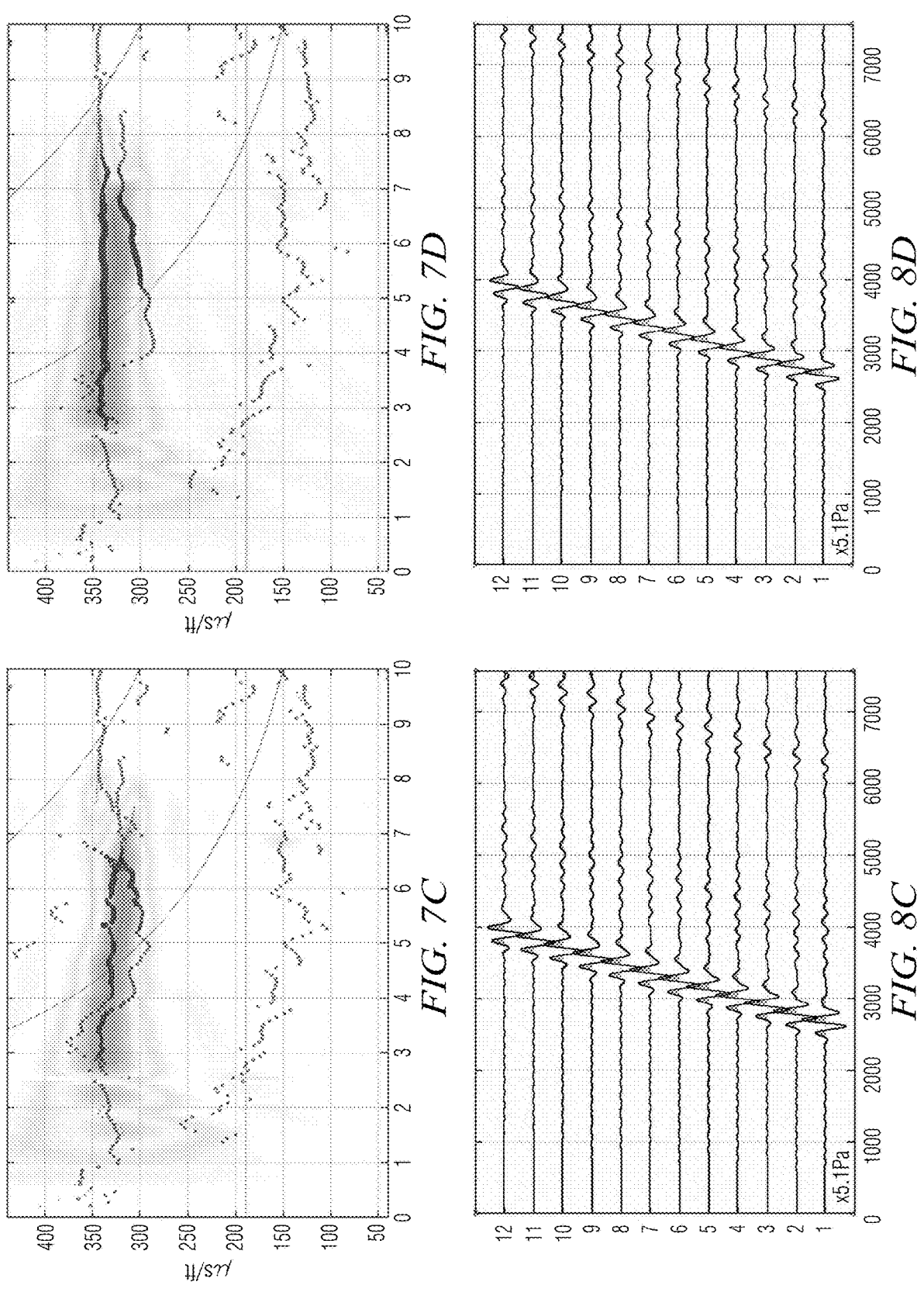
Figures 7E, 7F, 8E, 8F:
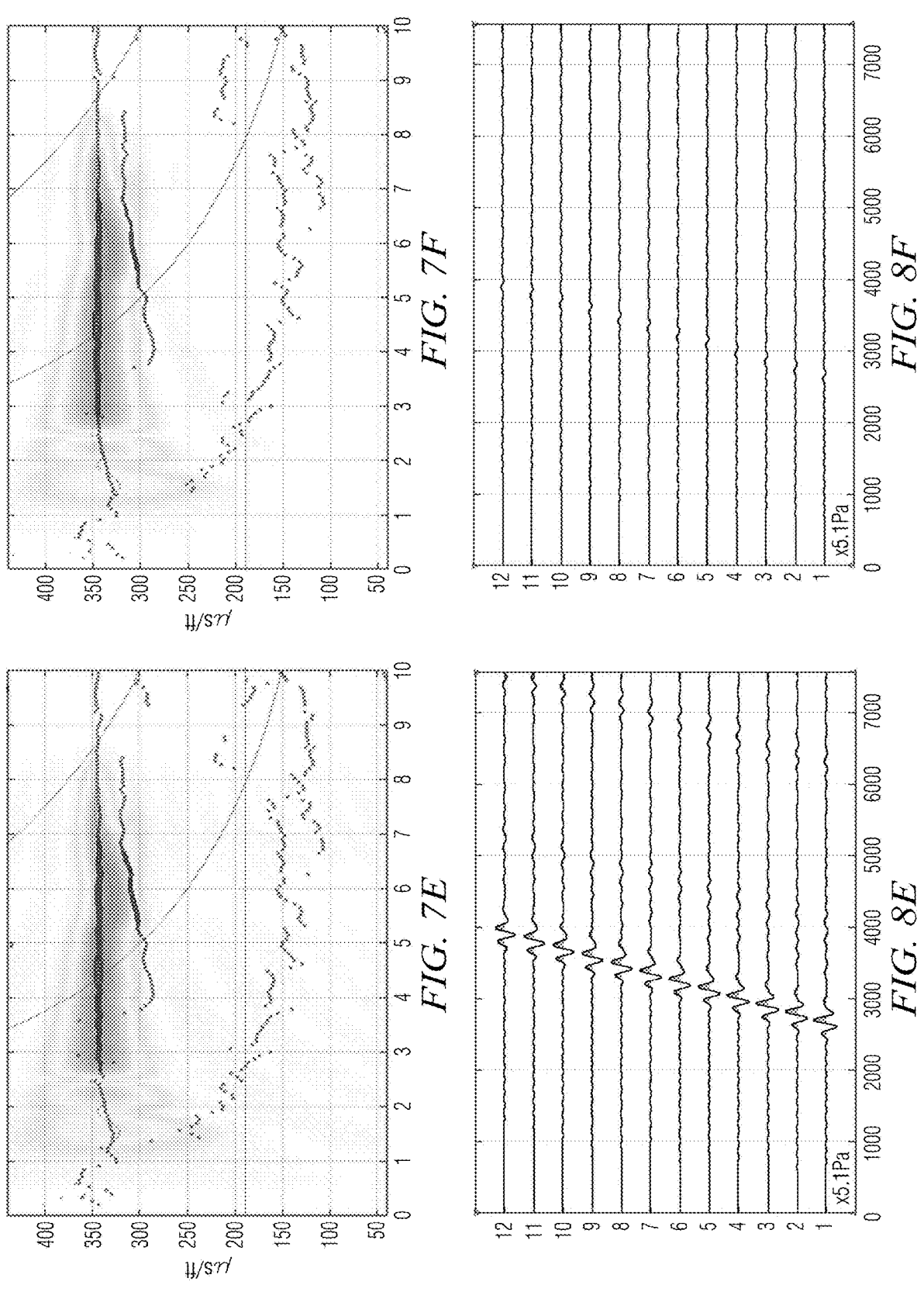

FIGS. 8A-8F (collectively FIG. 8) depict monopole
decomposed waveforms corresponding to the dispersion
curves shown in FIG. 7. Note that the amplitude of the
monopole decomposed waveforms is highest when the
eccentering direction is parallel (aligned) with the dipole
orientation (FIG. 8B) and decreases as the angle therebe-
tween increases to 90 degrees. Note also that the amplitudes
of the monopole decomposed waveforms are near zero when
the eccentering direction is orthogonal with the dipole orientation (FIG. 8F). Based on the foregoing, it will be appreciated that screening or removing measurements having a large monopole component (e.g., above a threshold) may advantageously significantly improve the SNR of the measurements (e.g., by removing measurements made when the tool is eccentered along the dipole transmission direction).

Figure 9A:
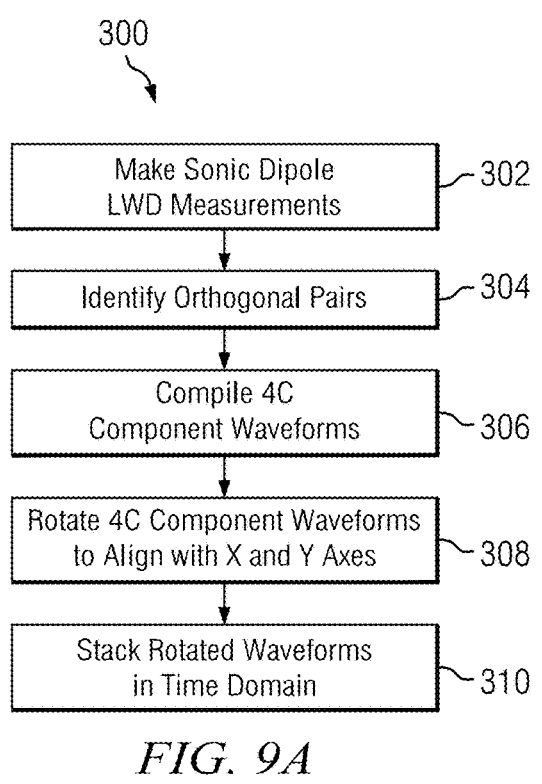
FIGS. 9A and 9B (collectively FIG. 9) depict flow charts of still further example methods for making sonic logging measurements.
Figure 9B:
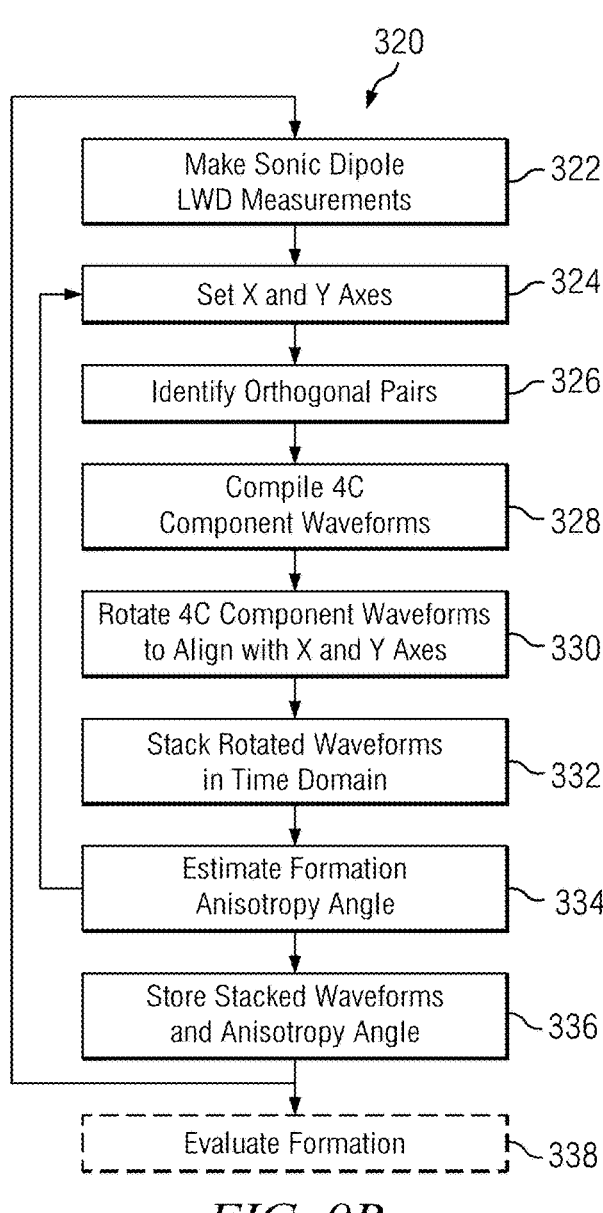

Turning now to FIGS. 9A and 9B (collectively FIG. 9) and with reference again to FIG. 4, flow charts of example methods 300 and 320 for making sonic logging measurements are depicted. In FIG. 9A, a plurality of dipole sonic logging measurements may be made at 302, for example, as described above with respect to FIG. 4. Briefly, the sonic logging tool is rotated in a wellbore while dipole waveforms are transmitted into the wellbore and corresponding waveforms are received by a directional receiver including a plurality of azimuthally spaced receiver arrays. These measurements may be made in sets corresponding to a predetermined time interval or depth interval in the wellbore. Orthogonal pairs of the measurements may be identified at 304 as also described above, for example, based on the corresponding toolface angles of the dipole transmitter firings. The 4C component waveforms corresponding to the identified orthogonal pairs may be compiled or obtained at 306 from among the dipole sonic logging measurements made at 302. The compiled 4C component waveforms are then rotated (by mathematical manipulation) to align with orthogonal axes (e.g., predefined or computed orthogonal axes) at 308 and the rotated waveforms may be stacked (averaged) in the time domain at 310 to reduce the SNR.

In FIG. 9B, a plurality of dipole sonic logging measurements may be made at 322, for example, as also described above. These measurements may be made in sets corresponding to a predetermined time interval or depth interval in the wellbore. Corresponding X and Y axes may be set at 324 (e.g., along assumed fast and slow axes of the formation). Orthogonal pairs of the measurements may be identified at 326 and the corresponding 4C component waveforms compiled and stored in a buffer at 328. The orthogonal pairs and/or 4C component waveforms may be identified and compiled, for example, as described above with respect to FIG. 6. The compiled 4C waveforms may then be rotated to a common rotational orientation (e.g., to be coincident or aligned with the X and Y axes) at 330. The rotated waveforms may then be stacked in the time domain at 332. In example embodiments, the stacked waveforms may be evaluated at 334 to estimate an anisotropy angle of the formation. The estimated anisotropy angle may then be used to set the X and Y axes for the next set of dipole sonic logging measurements (e.g., at the next depth or time interval). The stacked waveforms, the anisotropy angle, and other parameters may then be stored to system memory at 336 and may be optionally further processed and evaluated at 338 to assemble a log and/or estimate one or more properties of the subterranean formation.

Figure 10:
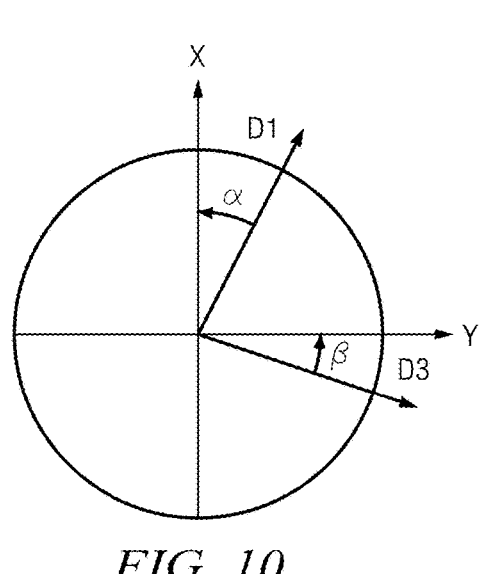
FIG. 10 depicts a schematic cross section illustrating example X and Y axes and an example identified orthogonal pair of first and second dipole measurements.

FIG. 10 depicts a schematic cross section illustrating example X and Y axes and an example orthogonal pair identified at 326 of FIG. 9 given by dipole measurements D1 and D3. In this example illustration, $\alpha$ represents the angle between the D1 dipole measurement and the X axis and $\beta$ represents the angle between the D3 dipole measurement and the Y axis. When $\alpha=\beta$ the identified orthogonal pair has perfect orthogonality (i.e., the angle between D1 and D3 is equal to 90 degrees). When $\alpha\pm\beta$ the orthogonality error is equal to $\alpha-\beta$. Measurement pairs having and orthogonality error less than some criterial (e.g., 5 or 10 degrees) may be identified as being and orthogonal pair.

With continued reference to FIGS. 9 and 10, the 4C component waveforms may be rotated to be coincident with the defined X and Y axes at 308 and 332, for example, as follows:

$$\begin{bmatrix} XX_\alpha & YX_\alpha \\ XY_\alpha & YY_\alpha \end{bmatrix} = R(\alpha)\begin{bmatrix} XX & YX \\ XY & YY \end{bmatrix}R^T(\alpha) \tag{1}$$

where $$\begin{bmatrix} XX & YX \\ XY & YY \end{bmatrix}$$

represents the as measured 4C component waveforms, $$\begin{bmatrix} XX_\alpha & YX_\alpha \\ XY_\alpha & YY_\alpha \end{bmatrix}$$

represents the rotated waveforms, $$R(\alpha) = \begin{bmatrix} \cos(\alpha) & \sin(\alpha) \\ -\sin(\alpha) & \cos(\alpha) \end{bmatrix},$$

and $\alpha$ represents the angle between the X transmitter firing and the X axis. It will be appreciated that Eq. (1) assumes that the orthogonal pair has perfect orthogonality (i.e., such that $\alpha=\beta$ in FIG. 10). This assumption may be valid, for example, when the orthogonality error is less than about 1 or 2 degrees. For LWD applications, for which the orthogonal pairs are generally only approximately orthogonal (e.g., when the orthogonality error is up to 5 or 10 degrees or more), Eq. (1) may be modified, for example, as follows:

$$\begin{bmatrix} XX_{\alpha\beta} & YX_{\alpha\beta} \\ XY_{\alpha\beta} & YY_{\alpha\beta} \end{bmatrix} = R(\alpha)\begin{bmatrix} XX & YX + (YY - XX)\tan(\alpha - \beta) \\ XY & YY - (XY + YX)\tan(\alpha - \beta) \end{bmatrix}R^T(\alpha) \tag{2}$$

where $$\begin{bmatrix} XX & YX \\ XY & YY \end{bmatrix}$$

again represents the as measured 4C component waveforms, $$\begin{bmatrix} XX_{\alpha\beta} & YX_{\alpha\beta} \\ XY_{\alpha\beta} & YY_{\alpha\beta} \end{bmatrix}$$

represents the rotated waveforms, $\alpha$ represents the angle between the X transmitter firing and the X axis, and $\beta$ represents the angle between the Y transmitter firing and the Y axis. It will be appreciated that Eq. (2) first corrects for the orthogonality error $(\alpha-\beta)$ and then rotates the corrected waveforms by the angle $\alpha$. Note that the YX component of the original 4C component waveforms is corrected by the term $+(YY-XX)\tan(\alpha-\beta)$ and that the original YY component is corrected by the term $-(XY+YX)\tan(\alpha-\beta)$.

Eq. (2) advantageously includes only linear combinations of the original 4C waveforms and may be computed quickly using a downhole processor (e.g., via controller 80 in FIG.

2). Moreover, Eq. (2) has been described with respect to rotating waveforms to align with mutually orthogonal X and Y directions. However, Eq. (2) may also be used rotate waveforms towards any non-orthogonal X and Y axes.

One example approach to estimate the anisotropy angle and the directions of the X and Y axes at 334 may be to minimize the error caused by waveform rotations for n desired combinations of dipole firings pairs. Owing to internal inaccuracies in tool positioning system and possible digit error in mathematical algorithms applied towards discretized waveforms, it may be useful to find the optimal X and Y axes which minimizes the error value ε(X, Y) for the following target function:

$$\varepsilon(X, Y) = \sum\nolimits_{i=1}^{n} E(\alpha_i, \beta_i), \qquad (3)$$

where $\alpha_i$ and $\beta_i$ represent the angles between the first and second transmitter firing direction of $i^{th}$ dipole orthogonal pair and the corresponding X and Y axes, and E represents an error value caused by waveform rotation by angles $\alpha_i$ and $\beta_i$.

The directions of the X and Y axes may be also determined by evaluating the stacked waveforms. Assuming that the current firing frame is the $(i-1)^{th}$ from the start of the data acquisition, and that the direction of the anisotropy axis determined is 0, the pre-defined direction for the $i^{th}$ data acquisition may be formulated as follows:

$$\Theta_{i,i-1,i-2,\dots,3,2,1} = w \cdot \theta_i + w' \cdot \Theta_{i-1,i-2,\dots,3,2,1} \qquad (4)$$

where Θ represents the estimated anisotropy axis from the rotated and stacked dipole logging measurements, the subscripts indicate that the information is estimated from those firings, and w (w') represents a weighting factor to provide the best estimate of the anisotropy axis for the $i^{th}$ data acquisition.

The determined angle Θ provides and estimate of the anisotropy axis of the formation in substantially real time while logging (and drilling). The X and Y axes may then be defined based on the determined angle Q (e.g., the angle that that minimizes the XY and YX cross components or cross-line energies). After a certain number of iterations (i) in Eq. (4), the rotated angle along X-Y axis may be aligned with the anisotropy axis of formations. The thus obtained stacked waveforms using the pre-rotated waveforms using the determined angle Q tend to have smaller contribution of cross component, which may enable real time processing of the waveforms. The thus obtained stacked waveforms using the pre-rotated waveforms using the determined angle Θ tend to have smaller contribution of cross-line energies, which enables real time processing of the waveforms computationally easier.

FIGS. 11A, 11B, 11C, and 11D (collectively FIG. 11) depict example modeled dipole waveforms (11A and 11B) and corresponding slowness frequency dispersion curves (11C and 11D) obtained using the method disclosed in FIG. 9. In this example, the model assumes a directional sonic logging tool (such as tool 50) having an 8.25 inch outer stabilizer diameter deployed in an wellbores having diameters of 9 inches (11A and 11C) and 9.5 inches (11B and 11D). The depicted waveforms in FIGS. 11A and 11B are shown at several eccentering angles as indicated and are representative of sonic logging measurements made while the logging tool whirls or rolls around the wellbore wall (such that the eccentering direction changes with time). Note that the waveforms are highly affected by the eccentering direction of the sonic logging tool may provide a measurement that is closer to that for a centered logging tool. Note also that time domain stacking significantly reduces the scatter and noise in the dispersion curves shown in FIGS. 11B and 11D.

Figure 12:
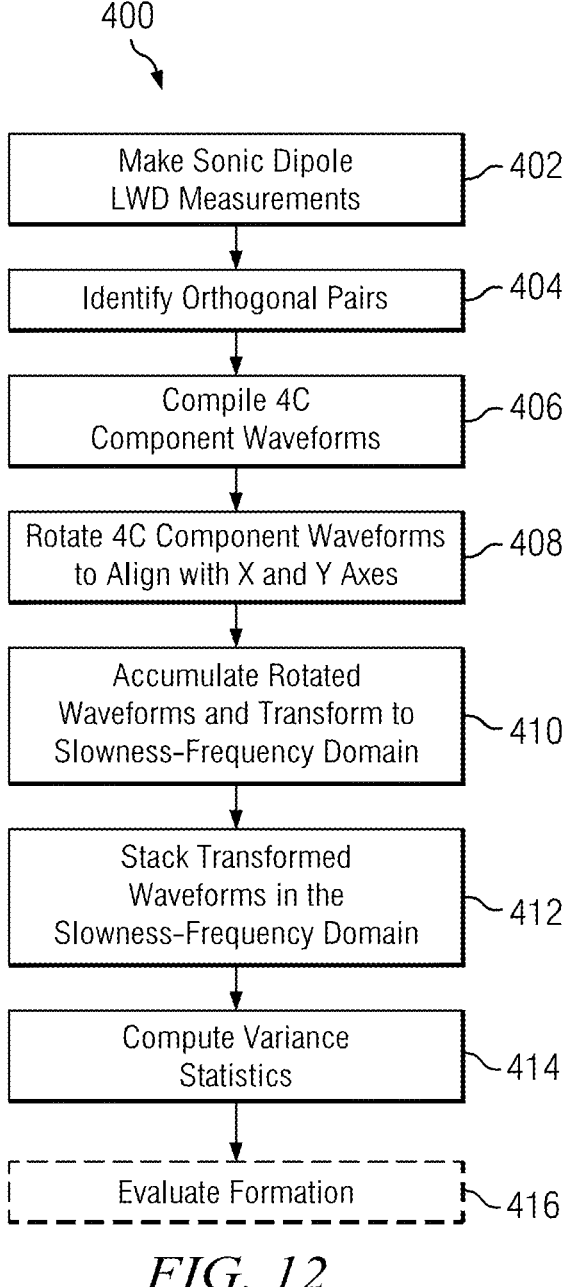
FIG. 12 depicts a flow chart of yet a further example method for making sonic logging measurements.

Turning now to FIG. 12, a flow chart of an example method 400 for making sonic logging measurements is depicted. Method 400 is similar to methods 100, 200, and 300 described above in that it includes making a plurality of dipole sonic logging measurements at 402, for example, as described above with respect to FIG. 4. The measurements may be made in sets corresponding to a predetermined time interval or depth interval in the wellbore. Orthogonal pairs of the measurements may be identified at 404 as also described above, for example, based on the corresponding toolface angles of the dipole transmitter firings. The 4C component waveforms corresponding to the identified orthogonal pairs may be compiled or obtained at 406 from among the dipole sonic logging measurements made at 402. The compiled 4C component waveforms may then be rotated to align with orthogonal axes (e.g., predefined or computed orthogonal axes) at 408 as also described above.

With continued reference to FIG. 12, the rotated waveforms may be accumulated and transformed into the slowness-frequency domain at 410 (or transformed and then accumulated). The transformed waveforms (the dispersion curves) may then be stacked (e.g., averaged) at 412 to provide an average or median dispersion curve (e.g., average or median slowness values with respect to frequency). Such slowness-frequency domain stacking may advantageously improve the SNR. The transformed waveforms may be optionally further processed at 414 to compute variance statistics that show the slowness variance (e.g., standard deviation or another variance measure) with respect to frequency. Such statistics may advantageously provide a frequency dependent quality control measure of the sonic measurements. The stacked dispersion curves and statistics may be optionally further processed and evaluated at 416 to assemble a log and/or estimate one or more properties of the subterranean formation.

Figures 13A, 13B:
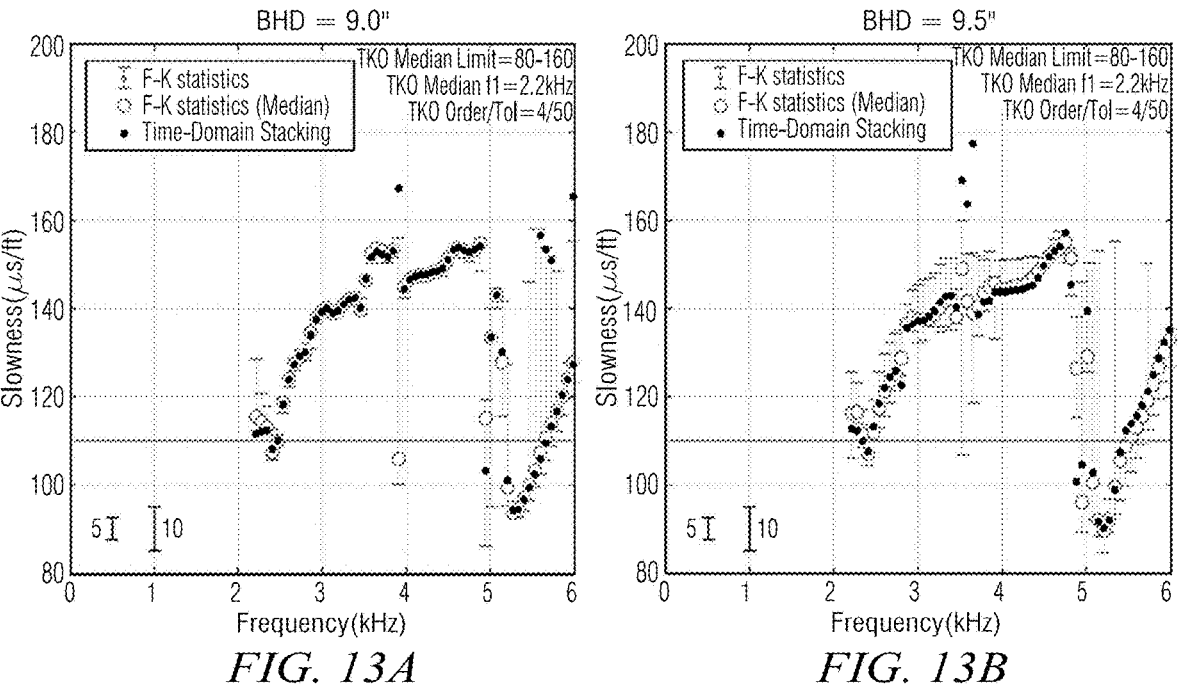
FIGS. 13A and 13B (collectively FIG. 13) depict example slowness frequency dispersion curves obtained using the method shown on FIG. 12.

FIGS. 13A and 13B (collectively FIG. 13) depict modeled slowness frequency dispersion curves computed using the method 400 (FIG. 12). The modeled dispersion curves were for a directional sonic logging tool (such as tool 50) having an 8.25 inch outer stabilizer diameter deployed in an wellbores having diameters of 9 inches (13A) and 9.5 inches (13B). Note that the dispersion curves include the median slowness at each frequency (open circles) and the variance at each frequency (the F-K statistics). The median slowness values at each frequency were in good agreement with the time domain stacked slowness values (dark circles) where the variance at each frequency is relatively smaller and provide improved SNR.

With continued reference to FIGS. 11 and 13, it will be noted that while the time domain stacking described above with respect to FIGS. 9-11 and the frequency domain stacking described above with respect to FIGS. 12-13 provide for significant SNR improvements that these methods alone may not always provide the best results. For example, note the high variance across all frequencies in FIG. 13B. Note also that while both the time domain and slowness-frequency domain stacking methods provide significantly improved SNR that these slowness values are offset from the slowness values when the logging tool is centered in the wellbore (in FIG. 11). While not wishing to be bound by theory, it is believed that the slowness offset and the high slowness variance can result from stacking high quality measurements and low quality (noisy) measurements (in either the time or frequency domain). It is therefore believed that in particularly noisy applications that method 100 may represent the most advantageous embodiment in that it combines the attributes of methods 200 and 300 and/or 400. Other highly advantageous embodiments may include combinations of methods 200 and 300 and methods 200 and 400 that make use of monopole screening and either time domain or slowness-frequency domain stacking.

Figures 14A, 14B:
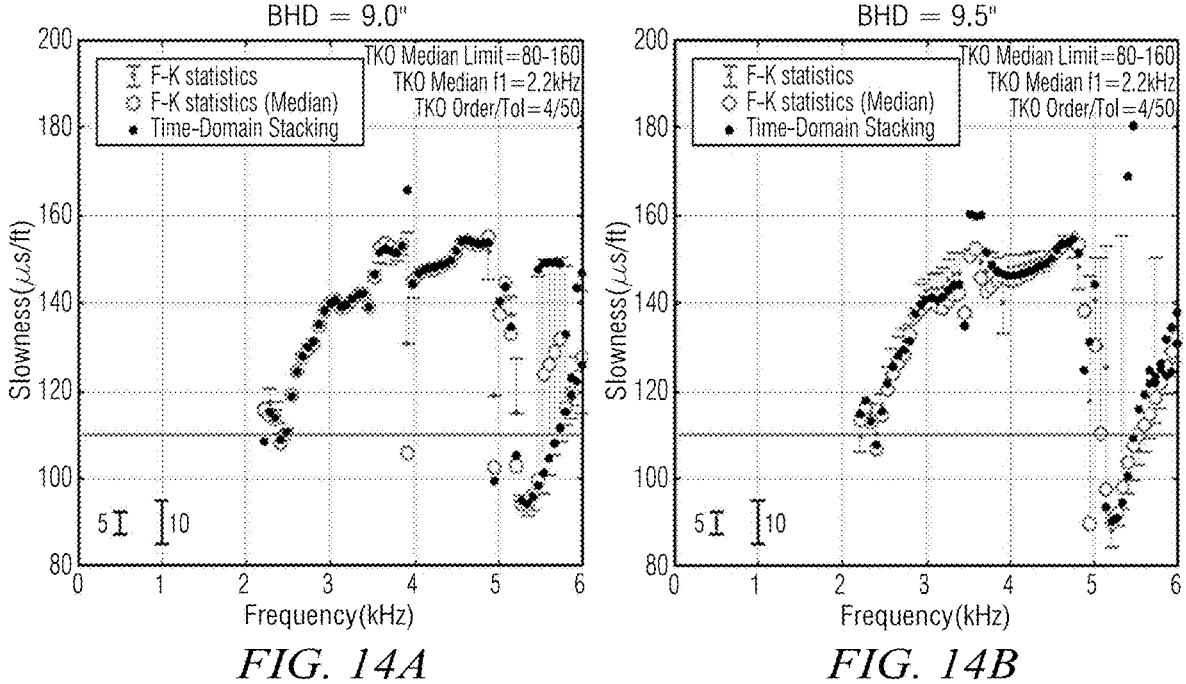
FIGS. 14A and 14B (collectively FIG. 14) depict example slowness frequency dispersion curves obtained using the method shown on FIG. 4.

FIGS. 14A and 14B (collectively FIG. 14) depict modeled slowness frequency dispersion curves computed using the method 100 (FIG. 4) and employed monopole screening, time domain stacking, and frequency domain stacking. The modeled dispersion curves were for a directional sonic logging tool (such as tool 50) having an 8.25 inch outer stabilizer diameter deployed in an wellbores having diameters 9 inches (14A) and 9.5 inches (14B). Note that the use of monopole screening along with the time domain stacking and frequency domain stacking provides improved consistency and significantly reduced the slowness variance, particularly in the larger diameter wellbore (14B) where the measurements are more readily corrupted by tool eccentering.

It will be understood that the present disclosure includes numerous embodiments. These embodiments include, but are not limited to, the following embodiments.

In a first embodiment, a method for acoustic logging a wellbore comprises rotating a logging tool in a wellbore penetrating a subterranean formation, the logging tool including an acoustic transmitter and a directional acoustic receiver including a plurality of circumferentially spaced receiver arrays; making a plurality of directional sonic logging measurements while rotating the logging tool in the wellbore; identifying a plurality of orthogonal pairs of measurements among the plurality of directional sonic logging measurements, wherein each of the plurality of orthogonal pairs includes a first measurement and a second measurement, wherein a measured angle of a transmitter firing direction of the first measurement is orthogonal with a measured angle of a transmitter firing direction of the second measurement within a predetermined tolerance; compiling 4C component waveforms for each of the identified plurality of orthogonal pair of waveforms; rotating the compiled 4C component waveforms to align with predefined axes; and stacking selected ones of the rotated 4C component waveforms in the time domain.

A second embodiment may include the first embodiment, further comprising transforming the time domain stacked waveforms to a frequency domain to obtain a dispersion.

A third embodiment may include the second embodiment, further comprising evaluating the dispersion to generate an acoustic log or determine at least one property of the subterranean formation.

A fourth embodiment may include any one of the first through third embodiments, wherein the making the plurality of directional sonic logging measurements comprises making a plurality of dipole sonic logging measurements.

A fifth embodiment may include any one of the first through fourth embodiments, wherein the making the plurality of dipole sonic logging measurements, further comprises: firing the acoustic transmitter a plurality of times while the logging tool rotates in the wellbore to generate a corresponding plurality of dipole waveforms; receiving the plurality of dipole waveforms at the directional receiver; and measuring an angle corresponding to each of the plurality of transmitter firings.

A sixth embodiment may include any one of the first through fifth embodiments, further comprising: estimating an anisotropy angle of the formation from the stacked waveforms; and using the anisotropy angle of the formation to set the predefined axes for a subsequent set of sonic logging measurements.

A seventh embodiment may include the sixth embodiment, wherein the estimating the anisotropy angle and the setting the predefined axes further comprises minimizing cross-line energies of the rotated 4C component waveforms for a plurality of desired combinations of dipole transmitter firing pairs.

An eighth embodiment may include any one of the first through seventh embodiments, wherein the rotating the compiled 4C component waveforms further comprises: correcting the 4C component waveforms for an orthogonality error in the orthogonal pair; and rotating the corrected waveforms by an angle between the first waveforms of the orthogonal pair and a first one of the predefined axes.

A ninth embodiment may include any one of the first through eighth embodiments, further comprising: transforming the rotated 4C component waveforms to a frequency domain; and stacking selected ones of the transformed rotated 4C component waveforms in the frequency domain to compute a median or average slowness at each of a plurality of frequencies.

A tenth embodiment may include the ninth embodiment, further comprising computing a slowness variance at each of the plurality of frequencies.

In an eleventh embodiment, an acoustic logging while drilling tool comprises: a logging while drilling tool body; an acoustic transmitter deployed in the logging while drilling tool body; a directional acoustic receiver including a plurality of circumferentially spaced receiver arrays deployed in the logging while drilling tool body axially spaced from the acoustic transmitter; and a controller deployed in the logging tool body and configured to: cause the acoustic transmitter and the direction acoustic receiver to make a plurality of directional sonic logging measurements while the logging while drilling tool rotates in a wellbore; identify a plurality of orthogonal pairs of measurements among the plurality of directional sonic logging measurements, wherein each of the plurality of orthogonal pairs includes a first measurement and a second measurement, wherein a measured angle of a transmitter firing direction of the first measurement is orthogonal with a measured angle of a transmitter firing direction of the second measurement within a predetermined tolerance; compile 4C component waveforms for each of the identified plurality of orthogonal pair of waveforms; rotate the compiled 4C component waveforms to align with predefined axes; and stack selected ones of the rotated 4C component waveforms in the time domain.

A twelfth embodiment may include the eleventh embodiment, wherein the directional sonic logging measurements are dipole sonic logging measurements.

A thirteenth embodiment may include any one of the eleventh through twelfth embodiments, wherein the controller is further configured to: estimate an anisotropy angle of the formation from the stacked waveforms; and use the anisotropy angle of the formation to set the predefined axes for a subsequent set of sonic logging measurements.

A fourteenth embodiment may include any one of the eleventh through thirteenth embodiments, wherein the rotate the compiled 4C component waveforms further comprises: correct the 4C component waveforms for an orthogonality error in the orthogonal pair; and rotate the corrected waveforms by an angle between the first waveforms of the orthogonal pair and a first one of the predefined axes.

A fifteenth embodiment may include any one of the eleventh through fourteenth embodiments, wherein the controller is further configured to transform the rotated 4C component waveforms to a frequency domain; stack selected ones of the transformed rotated 4C component waveforms in the frequency domain to compute a median or average slowness at each of a plurality of frequencies; and compute a slowness variance at each of the plurality of frequencies.

In a sixteenth embodiment, a method for acoustic logging a wellbore comprises: rotating a logging tool in a wellbore penetrating a subterranean formation, the logging tool including an acoustic transmitter and a directional acoustic receiver including a plurality of circumferentially spaced receiver arrays; making a plurality of directional sonic logging measurements while rotating the logging tool in the wellbore; identifying a plurality of orthogonal pairs of measurements among the plurality of directional sonic logging measurements, wherein each of the plurality of orthogonal pairs includes a first measurement and a second measurement, wherein a measured angle of a transmitter firing direction of the first measurement is orthogonal with a measured angle of a transmitter firing direction of the second measurement within a predetermined tolerance; compiling 4C component waveforms for each of the identified plurality of orthogonal pair of waveforms; rotating the compiled 4C component waveforms to align with predefined axes; stacking selected ones of the rotated 4C component waveforms in the time domain; estimating an anisotropy angle of the formation from the stacked waveforms; using the anisotropy angle of the formation to set new predefined axes; and repeating the making, the identifying, the compiling, the rotating, and the stacking using the new predefined axes.

A seventeenth embodiment may include the sixteenth embodiment, further comprising: transforming the time domain stacked waveforms to a frequency domain to obtain a dispersion; and evaluating the dispersion to generate an acoustic log or determine at least one property of the subterranean formation.

An eighteenth embodiment may include any one of the sixteenth through seventeenth embodiments, wherein the making the plurality of sonic logging measurements, further comprises: firing the acoustic transmitter a plurality of times while the logging tool rotates in the wellbore to generate a corresponding plurality of dipole waveforms; receiving the plurality of dipole waveforms at the directional receiver; and measuring a toolface angle corresponding to each of the plurality of transmitter firings.

A nineteenth embodiment may include any one of the sixteenth through eighteenth embodiments, wherein the rotating the compiled 4C component waveforms further comprises: correcting the 4C component waveforms for an orthogonality error in the orthogonal pair; and rotating the corrected waveforms by an angle between the first waveforms of the orthogonal pair and a first one of the predefined axes.

A twentieth embodiment may include any one of the sixteenth through nineteenth embodiments, further comprising: transforming the rotated 4C component waveforms to a frequency domain; stacking selected ones of the transformed rotated 4C component waveforms in the frequency domain to compute a median or average slowness at each of a plurality of frequencies; and computing a slowness variance at each of the plurality of frequencies.

Although time domain stacking of acoustic dipole LWD measurements has been described in detail, it should be understood that various changes, substitutions and alternations can be made herein without departing from the spirit and scope of the disclosure as defined by the appended claims.

What is claimed is:

1. A method for acoustic logging a wellbore, the method comprising:

rotating a logging tool in a wellbore penetrating a subterranean formation, the logging tool including an acoustic transmitter and a directional acoustic receiver including a plurality of circumferentially spaced receiver arrays;

making a plurality of directional sonic logging measurements while rotating the logging tool in the wellbore;

identifying a plurality of orthogonal pairs of measurements among the plurality of directional sonic logging measurements, wherein each of the plurality of orthogonal pairs includes a first measurement and a second measurement, wherein a measured angle of a transmitter firing direction of the first measurement is orthogonal with a measured angle of a transmitter firing direction of the second measurement within a predetermined tolerance;

compiling 4C component waveforms for each of the identified plurality of orthogonal pairs of measurements;

rotating the compiled 4C component waveforms to align with predefined axes; and stacking selected ones of the rotated 4C component waveforms in the time domain.

2. The method of claim 1, further comprising transforming the time domain stacked waveforms to a frequency domain to obtain a dispersion.

3. The method of claim 2, further comprising evaluating the dispersion to generate an acoustic log or determine at least one property of the subterranean formation.

4. The method of claim 1, wherein the making the plurality of directional sonic logging measurements comprises making a plurality of dipole sonic logging measurements.

5. The method of claim 4, wherein the making the plurality of dipole sonic logging measurements, further comprises:

firing the acoustic transmitter a plurality of times while the logging tool rotates in the wellbore to generate a corresponding plurality of dipole waveforms;

receiving the plurality of dipole waveforms at the directional receiver; and measuring an angle corresponding to each of the plurality of transmitter firings.

6. The method of claim 1, further comprising:

estimating an anisotropy angle of the formation from the stacked waveforms; and using the anisotropy angle of the formation to set the predefined axes for a subsequent set of sonic logging measurements.

7. The method of claim 6, wherein the estimating the anisotropy angle and the setting the predefined axes further comprises minimizing cross-line energies of the rotated 4C component waveforms for a plurality of desired combinations of dipole transmitter firing pairs.

8. The method of claim 1, wherein the rotating the compiled 4C component waveforms further comprises:

correcting the 4C component waveforms for an orthogonality error in the orthogonal pair; and rotating the corrected waveforms by an angle between the first waveforms of the orthogonal pair and a first one of the predefined axes.

9. The method of claim 1, further comprising:

transforming the rotated 4C component waveforms to a frequency domain; and stacking selected ones of the transformed rotated 4C component waveforms in the frequency domain to compute a median or average slowness at each of a plurality of frequencies.

10. The method of claim 9, further comprising computing a slowness variance at each of the plurality of frequencies.

11. An acoustic logging while drilling tool comprising:

a logging while drilling tool body;

an acoustic transmitter deployed in the logging while drilling tool body;

a directional acoustic receiver including a plurality of circumferentially spaced receiver arrays deployed in the logging while drilling tool body axially spaced from the acoustic transmitter;

a controller deployed in the logging tool body and configured to:

cause the acoustic transmitter and the direction acoustic receiver to make a plurality of directional sonic logging measurements while the logging while drilling tool rotates in a wellbore;

identify a plurality of orthogonal pairs of measurements among the plurality of directional sonic logging measurements, wherein each of the plurality of orthogonal pairs includes a first measurement and a second measurement, wherein a measured angle of a transmitter firing direction of the first measurement is orthogonal with a measured angle of a transmitter firing direction of the second measurement within a predetermined tolerance;

compile 4C component waveforms for each of the identified plurality of orthogonal pairs of measurements;

rotate the compiled 4C component waveforms to align with predefined axes; and stack selected ones of the rotated 4C component waveforms in the time domain.

12. The logging while drilling tool of claim 11, wherein the directional sonic logging measurements are dipole sonic logging measurements.

13. The logging while drilling tool of claim 11, wherein the controller is further configured to:

estimate an anisotropy angle of the formation from the stacked waveforms; and use the anisotropy angle of the formation to set the predefined axes for a subsequent set of sonic logging measurements.

14. The logging while drilling tool of claim 11, wherein the rotate the compiled 4C component waveforms further comprises:

correct the 4C component waveforms for an orthogonality error in the orthogonal pair; and rotate the corrected waveforms by an angle between the first waveforms of the orthogonal pair and a first one of the predefined axes.

15. The logging while drilling tool of claim 11, wherein the controller is further configured to:

transform the rotated 4C component waveforms to a frequency domain;

stack selected ones of the transformed rotated 4C component waveforms in the frequency domain to compute a median or average slowness at each of a plurality of frequencies; and compute a slowness variance at each of the plurality of frequencies.

16. A method for acoustic logging a wellbore, the method comprising:

rotating a logging tool in a wellbore penetrating a subterranean formation, the logging tool including an acoustic transmitter and a directional acoustic receiver including a plurality of circumferentially spaced receiver arrays;

making a plurality of directional sonic logging measurements while rotating the logging tool in the wellbore;

identifying a plurality of orthogonal pairs of measurements among the plurality of directional sonic logging measurements, wherein each of the plurality of orthogonal pairs includes a first measurement and a second measurement, wherein a measured angle of a transmitter firing direction of the first measurement is orthogonal with a measured angle of a transmitter firing direction of the second measurement within a predetermined tolerance;

compiling 4C component waveforms for each of the identified plurality of orthogonal pairs of measurements;

rotating the compiled 4C component waveforms to align with predefined axes;

stacking selected ones of the rotated 4C component waveforms in the time domain;

estimating an anisotropy angle of the formation from the stacked waveforms;

using the anisotropy angle of the formation to set new predefined axes; and repeating the making, the identifying, the compiling, the rotating, and the stacking using the new predefined axes.

17. The method of claim 16, further comprising:

transforming the time domain stacked waveforms to a frequency domain to obtain a dispersion; and evaluating the dispersion to generate an acoustic log or determine at least one property of the subterranean formation.

18. The method of claim 16, wherein the making the plurality of sonic logging measurements, further comprises:

firing the acoustic transmitter a plurality of times while the logging tool rotates in the wellbore to generate a corresponding plurality of dipole waveforms;

receiving the plurality of dipole waveforms at the directional receiver; and measuring a toolface angle corresponding to each of the plurality of transmitter firings.

19. The method of claim 16, wherein the rotating the compiled 4C component waveforms further comprises:

correcting the 4C component waveforms for an orthogonality error in the orthogonal pair; and rotating the corrected waveforms by an angle between the first waveforms of the orthogonal pair and a first one of the predefined axes.

20. The method of claim 16, further comprising:

transforming the rotated 4C component waveforms to a frequency domain;

stacking selected ones of the transformed rotated 4C component waveforms in the frequency domain to compute a median or average slowness at each of a plurality of frequencies; and computing a slowness variance at each of the plurality of frequencies.

* * * * *